United States Patent [19]
Ohnishi et al.

[11] Patent Number: 6,053,044
[45] Date of Patent: Apr. 25, 2000

[54] VIBRATORY GYROSCOPE

[75] Inventors: Kazumasa Ohnishi; Masayuki Tanaka; Katsutoshi Sakurai; Fumihito Shikanai, all of Niigata-ken, Japan

[73] Assignee: Alps Electric Co., Ltd., Tokyo, Japan

[21] Appl. No.: 09/014,002

[22] Filed: Jan. 27, 1998

[30] Foreign Application Priority Data

Jan. 27, 1997 [JP] Japan ................................. 9-012950

[51] Int. Cl.⁷ .................................................. G01P 9/04
[52] U.S. Cl. ................................. 73/504.15; 73/504.12
[58] Field of Search .......................... 73/504.12, 504.15, 73/504.16, 504.14; 310/370

[56] References Cited

U.S. PATENT DOCUMENTS

| | | | |
|---|---|---|---|
| 5,197,331 | 3/1993 | Oikawa | 73/504.12 |
| 5,451,828 | 9/1995 | Tomikawa et al. | 73/504.16 |
| 5,668,317 | 9/1997 | Farine et al. | 73/504.16 |
| 5,708,320 | 1/1998 | Ohnishi et al. | 310/370 |

FOREIGN PATENT DOCUMENTS

| | | |
|---|---|---|
| 195 44 338 A1 | 5/1998 | Germany . |
| 198 00 333 A1 | 7/1998 | Germany . |
| 4-14734 | 3/1992 | Japan . |

*Primary Examiner*—John E. Chapman
*Attorney, Agent, or Firm*—Brinks Hofer Gilson & Lione

[57] ABSTRACT

Described herein is a vibratory gyroscope. In the present vibratory gyroscope, two detection output portions are provided on a vibrator. The detection output portions are constructed such that an output (corresponding to a null output F0) obtained when no angular velocity is given, can be produced in phase and Coriolis output components FωC and FωD can be outputted in phase opposite to each other. Outputs C and D produced from both detection output portions result in the sum of vectors represented as F0 and FωC and the sum of vectors represented as F0 and FωD respectively. However, the sensitivity of detection of Coriolis force components can be increased by determining the difference φ in phase between the detected outputs C and D.

8 Claims, 10 Drawing Sheets

VIBRATORY GYROSCOPE

BACKGROUND OF THE INVENTION

1. Field of the Invention

This invention relates to a vibratory gyroscope in which vibrational components based on a Coriolis for produced in reference to an angular velocity are detected by piezoelectric effects.

2. Description of the Related Art

FIG. 12A is a perspective view showing a conventional vibratory gyroscope. FIG. 12B is a cross-sectional view of the vibratory gyroscope shown in FIG. 12A.

In this type of vibratory gyroscope, a driven piezoelectric device 32a is affixed to an upper surface 31a of a prismatic vibrator 31 formed of a constantly elastic alloy such as elinvar or the like and whose cross-section is square. When drive power is applied to the piezoelectric device 32a, the vibrator 31 produces a bending vibration with a Y direction as an amplitude direction.

When the vibrator 31 producing the bending vibration is placed within a rotational system and an angular velocity $\omega$ about a Z axis is given, a Coriolis force extending in a direction (corresponding to an X direction) intersecting the vibrational direction (corresponding to the Y direction) acts on the vibrator 31. Thus, a vibration occurs in the vibrator 31 based on the Coriolis force with the X direction defined as the amplitude direction. As a result, the vibrator 31 produces an elliptical vibration obtained by adding the drive vibration in the Y direction and the vibration in the X direction based on the Coriolis force on a vector basis.

Assuming now that the mass of the vibrator 31, the velocity of a vibrational component in the Y-axis direction and the angular velocity about the Z axis are defined as m, v (vector value) and $\omega$ (vector value) respectively, the Coriolis force F (vector value) is given by the following equation:

$$F = 2m(v \times \omega)) \quad (x: \text{vector product}) \qquad [\text{Equation 1}]$$

The Coriolis force F is proportional to the angular velocity $\omega$.

In order to detect the vibrational component based on the Coriolis force, a detecting piezoelectric device 33 is normally attached to a side face 31c facing the amplitude direction (X direction) of vibration of the Coriolis force as shown in FIG. 12B.

FIG. 11 shows an output produced from a surface electrode of the piezoelectric device 33 shown in FIG. 12B in the form of a vector diagram.

When no angular velocity $\omega$ is given in a state in which the drive power is supplied to the piezoelectric device 32a and the vibrator 31 is vibrating with the Y direction as the amplitude direction, the output produced from the surface electrode of the piezoelectric device 33 becomes F0. Since the vibrator 31 is vibration driven in the Y direction, this output F0 is power converted by the piezoelectric device 33 based on the vibration driving. This output F0 will hereinafter be referred to as "null output". The null output F0 is, for example, 90° out of phase with the drive signal supplied to the piezoelectric device 32a.

When the angular velocity $\omega$ is given and the vibrational component in the X direction based on the Coriolis force is produced, a Coriolis output F$\omega$ converted by the piezoelectric device 33 is produced according to the vibrational component based on the Coriolis force. Thus, a detected output F1 obtained from the surface electrode of the piezoelectric device 33 results in the sum of the null output F0 and Coriolis output F$\omega$ represented in vectors. The Coriolis output F$\omega$ indicated by a solid line in FIG. 11 corresponds to an output converted when the angular velocity $\omega$ about the Z axis is in the clockwise direction. When the angular velocity $\omega$ is counterclockwise, the Coriolis output F$\omega$ results in a vector direction indicated by a dotted line in FIG. 11.

A known method of determining the output component based on the Coriolis force from the detected output F1 obtained from the surface electrode of the piezoelectric device 33, involves determining the difference W in amplitude between F1·cos $\theta$ and the null output F0 and determining a change $\theta$ in phase of the detected output F1.

The method of determining the difference in amplitude is incapable of accurately detecting the difference W in amplitude between the F1·cos $\theta$ and the null output F0 when the null output F0 varies. In the vibratory gyroscope wherein the piezoelectric device is attached to the vibrator formed of the constantly elastic alloy, for example, the amplitude of the null output F0 is apt to vary due to a change in temperature. Thus, a temperature drift is produced when the component of the Coriolis force is detected.

Further, the method of detecting the change $\theta$ in phase difference has been disclosed in Japanese Patent Application Publication No. 4-14734, for example. According to the method disclosed in the same Publication, a feedback signal obtained from a feedback piezoelectric device 32b provided at a lower surface 31b of the vibrator 31 is 90° phase-shifted to form a compare signal identical in phase to the drive signal. On the basis of the compare signal, a change $\theta$ in phase of the detected output F1 obtained from the piezoelectric device 33 is determined from an EX-OR circuit (Exclusive OR gate circuit).

In the method of detecting the phase change $\theta$ to thereby determine the vibrational component of the Coriolis force, the influence of the temperature drift is less reduced as compared with the aforementioned amplitude detecting method because the method is unaffected by a change in amplitude of the null output due to the change in temperature.

Since, however, the amplitude of the Coriolis output F$\omega$ is smaller than that of the null output F0, the amount of change $\theta$ in phase is not so great and hence high-accuracy detection falls into difficulties. Since high-accuracy detection was difficult to perform, the accuracy of the circuit needs to be improved in order to detect a fine change in phase. This results in an increased in manufacturing cost. When the small phase change $\theta$ is detected with high sensitivity, the gain of an analog portion in the circuit must be increased and the influence of the circuit drift due to the change in temperature becomes great.

SUMMARY OF THE INVENTION

With the foregoing in view, it is therefore an object of the present invention to provide a vibratory gyroscope capable of detecting a change in phase of a detected output with high accuracy as compared with the conventional gyroscope, thereby making possible to enhance the accuracy of detection of an angular velocity.

According to a first aspect of the present invention, for achieving the above object, there is provided a vibratory gyroscope comprising:

a vibrator;

driving means for vibrating and driving the vibrator in a predetermined direction;

a detection unit for outputting vibrational components of the vibrator as electric signals by piezoelectric effects;

the detection unit having detection output portions provided in pairs, for obtaining outputs of the same phase when the vibrator is driven by the driving means and no angular velocity is given to the vibrator and superimposing outputs of vibrational components based on a Coriolis force on one another in phase opposite to each other when the angular velocity is given thereto; and means for detecting a difference in phase between the outputs produced from the detection output portions;

whereby the angular velocity is detected based on the output produced from the phase difference detecting means.

Further, according to a second aspect of the present invention, there is provided a vibratory gyroscope comprising:

a vibrator;

driving means for vibrating and driving the vibrator in a predetermined direction;

a detection unit for outputting vibrational components of the vibrator as electric signals by piezoelectric effects;

the detection unit having detection output portions provided in pairs, for obtaining outputs of the same phase when the vibrator is driven by the driving means and no angular velocity is given to the vibrator and superimposing outputs of vibrational components based on a Coriolis force on one another in phase opposite to each other when the angular velocity is given thereto;

adding means for adding outputs produced from the pair of detection output portions to thereby form a compare signal;

first phase difference detecting means for detecting a difference in phase between the output produced from the one detection output portion and the compare signal;

second phase difference detecting means for detecting a difference in phase between the output produced from the other detection output portion and the compare signal; and means for producing the difference between outputs obtained from the first and second phase difference detecting means;

whereby the angular velocity is detected based on the produced differential output.

In the present invention as described above, the pair of outputs whose null outputs are in phase and whose Coriolis output components are opposite in phase to each other, is obtained from the two detection output portions in the detection unit. In the aforementioned first aspect of the present invention, the difference in phase between the outputs produced from both detection output portions is determined. The outputs produced from the pair of detection output portions include the null outputs being in phase. Therefore, the determination of the difference in phase between the outputs produced form both detection output portions will result in the addition of the difference in phase between the Coriolis output and null output related to the output produced from one detection output portion and the difference in phase between the Coriolis output and null output related to the output produced from the other detection output portion. In the second aspect of the present invention, the Coriolis output components are deleted or canceled by adding the outputs produced from the individual detection output portions, whereby a signal being in phase with each null output is obtained. Each of the phase difference detecting means produces a compare signal based on the signal being in phase with the null output. On the basis of the compare signal, the differences in phase between the outputs obtained from their detected outputs are determined and both phase differences are added together.

Thus, the difference φ in phase between the sum of vectors for the Coriolis outputs different in phase from each other and the sum of vectors for the null outputs can be detected as shown in FIG. 10. Even if the amplitude of each Coriolis output is small, the detection of the phase difference φ allows a high-accuracy detection as compared with the conventional example for detecting the phase change θ shown in FIG. 11. Further, since the detection sensitivity is enhanced by detecting the two phase differences φ, the need for making the gain of the analog portion in the circuit higher than required is eliminated so that the influence of the circuit drift due to the change in temperature can be reduced.

As shown in FIG. 2, the above-described means can be constructed in such a manner that detection output portions 5a and 5b serve as electrodes formed on the same surface of a vibrator, and dielectric polarization directions of each piezoelectric material on which the pair of electrodes faces each other, are opposite to each other with respect to a vibrational direction. In this construction, detected outputs C and D for allowing null outputs to be in phase and causing Coriolis outputs to be different in phase from each other, can be obtained from the detection output portions 5a and 5b serving as the electrodes formed on the vibrator.

There may be cases where the detected outputs for allowing the null outputs to be in reverse phase and causing the Coriolis outputs to be in phase are obtained from the pair of detection output portions according to the dielectric polarization directions of the piezoelectric material and the positions of placement of the electrodes serving as the detection output portions. In this case, the provision of one detection output portion with a phase invertor circuit makes it possible to obtain detected outputs for allowing the null outputs to be in phase and causing the Coriolis outputs to be in reverse phase.

It is preferable that each vibrator is formed of a piezoelectric material over its entirety and the detection output portions are formed by electrodes formed on the surface of the piezoelectric material.

When the entire vibrator is formed of piezoelectric ceramic or crystal, it permits a further reduction in temperature drift as compared with one formed by placing a piezoelectric device on constantly elastic alloy.

In the present invention, however, the vibrator may be formed of constantly elastic alloy such as elinvar and with piezoelectric devices placed thereon as driving means and detecting means.

Incidentally, a trident tuning fork type or a bident tuning fork type is suitable as for a structure of the vibrator provided with the pair of detection output portions as shown in FIGS. 1 and 2. Alternatively, a columnar vibrator whose cross-section is an equilateral triangular, is used and detection output portions may be provided on two surfaces of the vibrator. Further, a vibrator having the square cross-section shown in FIG. 12 is used as an alternative to the above whereby detection portions may be respectively provided on two sides facing each other in an X direction.

Further, static converting means other than the piezoelectric material may be provided as the driving means for driving each vibrator.

Examples of the various inventions of the present application have been discussed in brief. However, the various inventions of the present application and specific configurations of these inventions will be more fully understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described in detail with reference to the accompanying drawings.

Figure 1A:
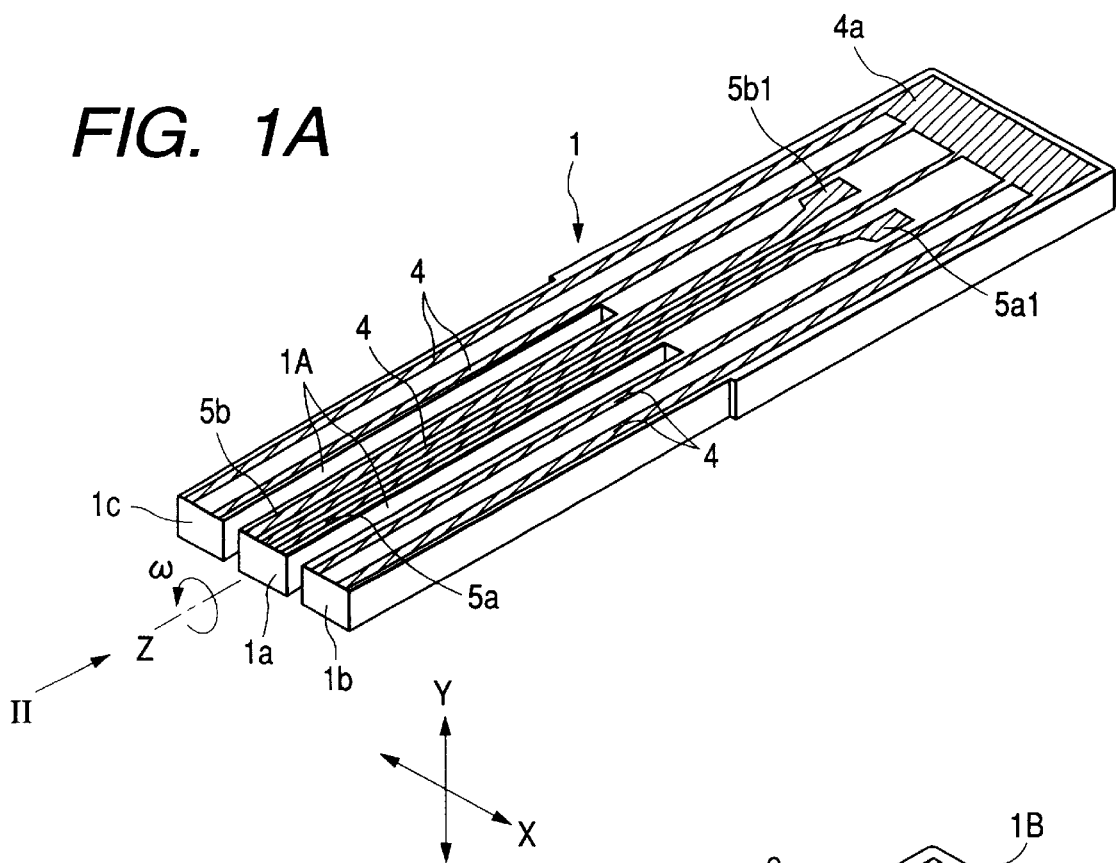
FIG. 1A is a perspective view showing a vibration body of a vibratory gyroscope of the present invention as seen from the front side thereof.
Figure 1B:
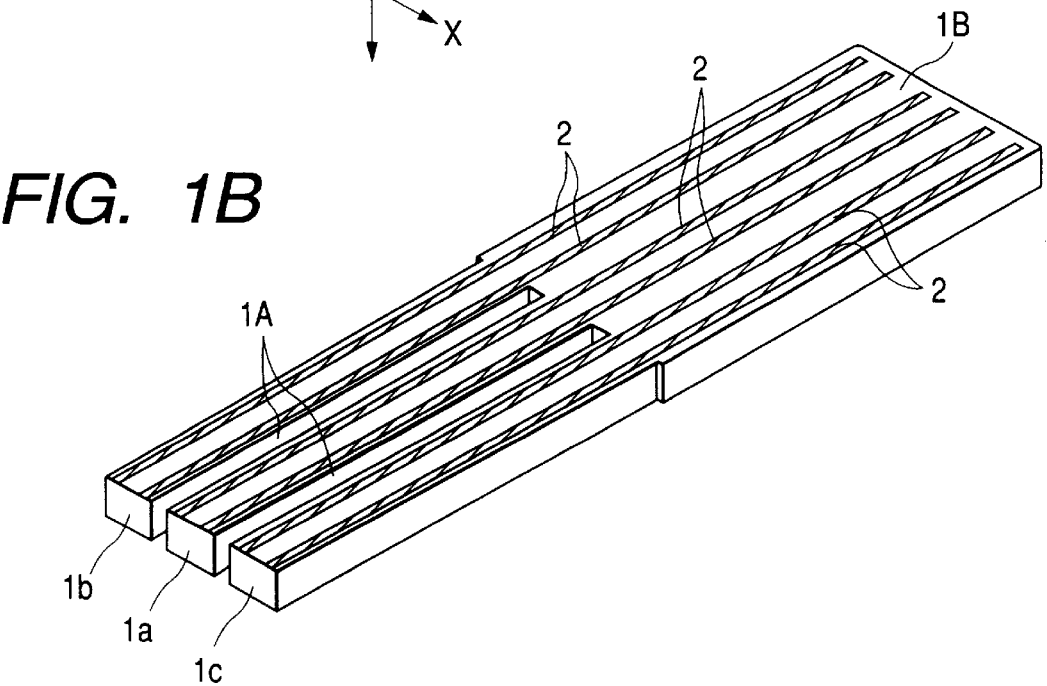
FIG. 1B is a perspective view illustrating the vibration body shown in FIG. 1A as seen from the reverse side thereof.
Figure 2:
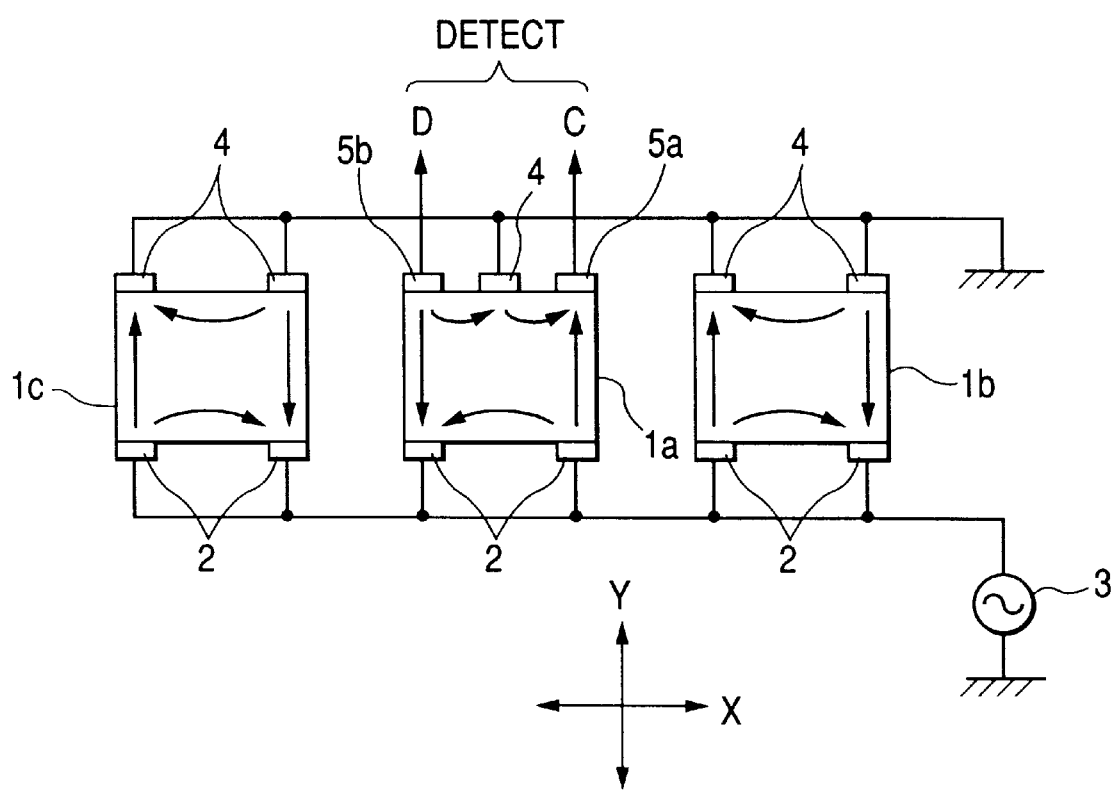
FIG. 2 is an end view showing vibrators as seen in the direction indicated by arrow II of FIG. 1A.
Figure 3:
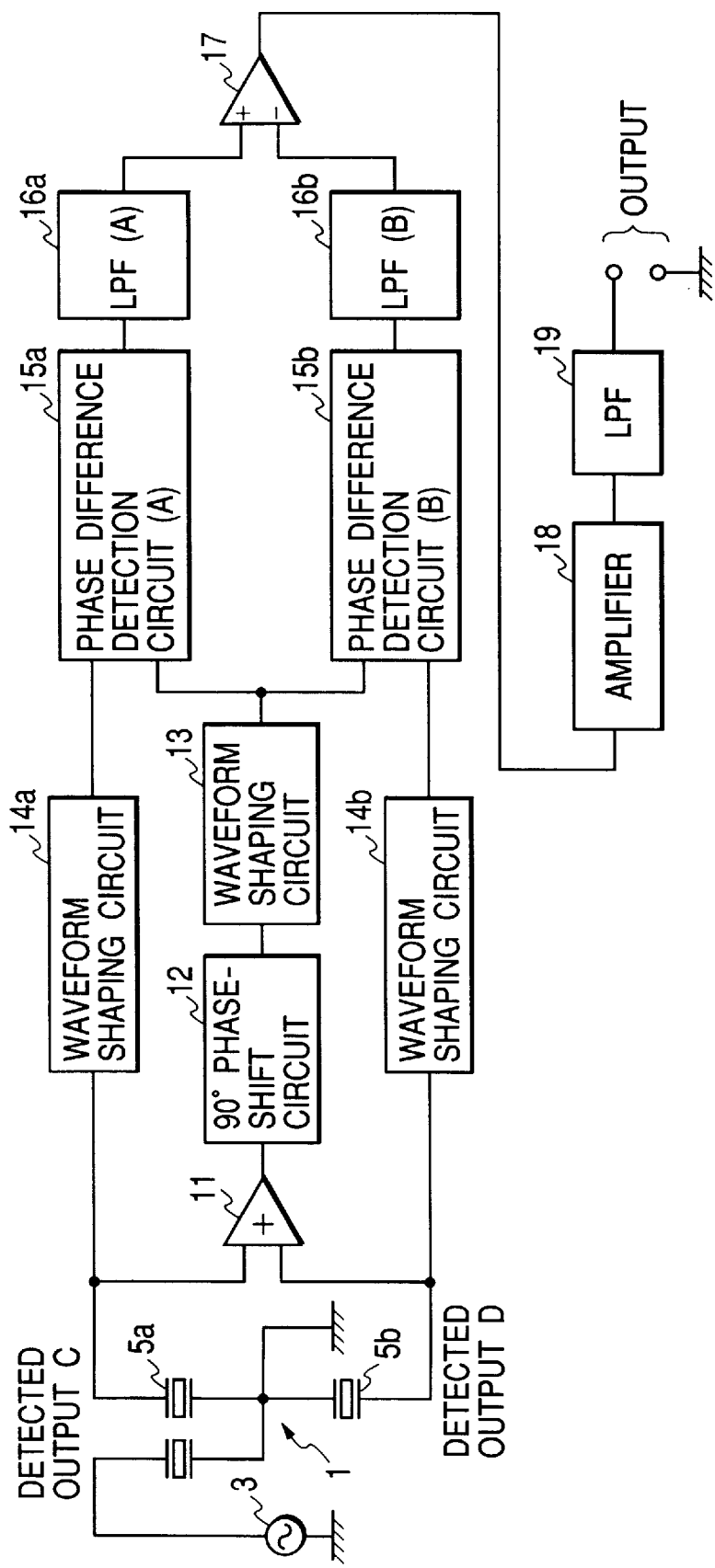
FIG. 3 is a circuit block diagram depicting a first embodiment of a detection circuit.
Figure 4:
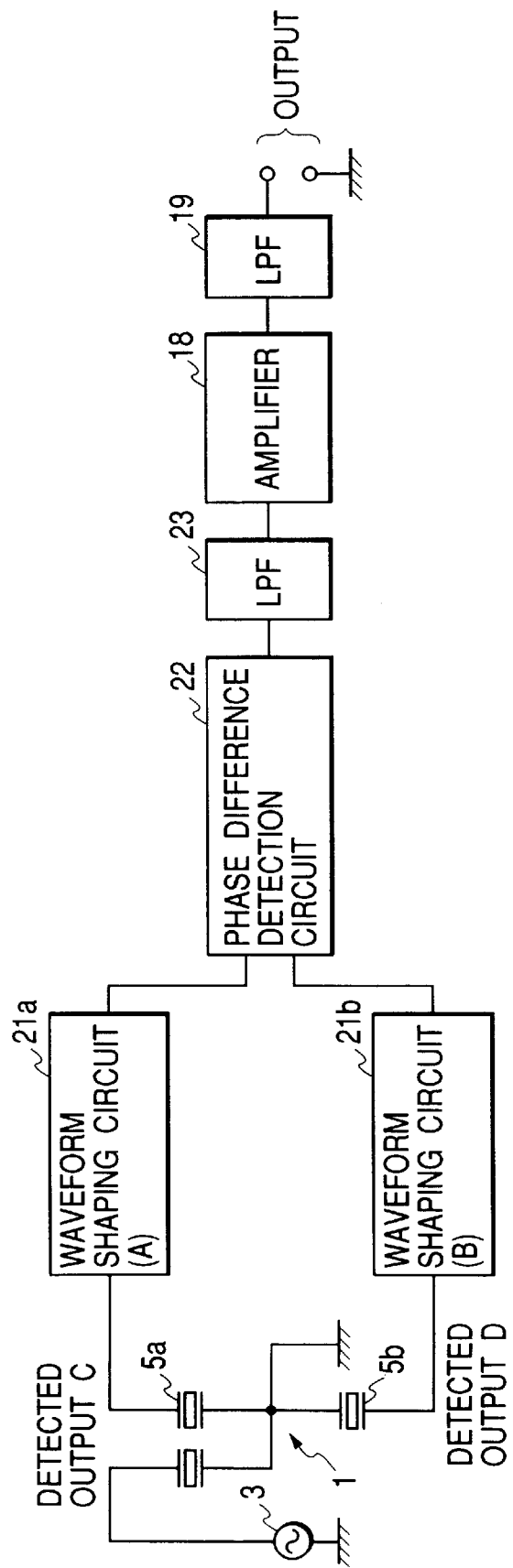
FIG. 4 is a circuit block diagram showing a second embodiment of a detection circuit.

FIG. 1A is a perspective view showing one surface of a vibration body of a vibratory gyroscope of the present invention. FIG. 1B is a perspective view illustrating the other surface of the vibration body thereof. FIG. 2 is an end view showing vibrators as seen in the direction indicated by arrow II of FIG. 1A. FIGS. 3 and 4 are respectively circuit block diagrams showing detection circuits according to embodiments.

A vibration body 1 is formed of a piezoelectric material such as plate-like piezoelectric ceramic or crystal or the like over its entirety. A leading portion of the vibration body is separated into three vibrators 1a, 1b and 1c by grooves 1A and 1A, which are shaped in integral form. Dielectric polarization directions of the piezoelectric materials for each of the vibrators 1a, 1b and 1c are represented as indicated by arrows in FIG. 2. The vibrators 1b and 1c on the right and left sides of the vibration body are identical to each other in dielectric polarization direction. The central vibrator 1a is symmetric with respect to the left and right vibrators 1b and 1c in the dielectric polarization direction as seen in the left and right and upward and downward directions.

In the respective vibrators 1a, 1b and 1c, respective pairs of drive electrodes 2 are provided on the lower sides thereof and formed of a conductive material respectively. As shown in FIG. 1B, the drive electrodes 2 extend to a basal end 1B of the vibration body 1. The drive electrodes 2 are electrically connected via unillustrated conductors or wires to an a.c. drive source 3 from which drive voltages identical in potential to each other are applied to the respective drive electrodes 2.

The left and right vibrators 1b and 1c respectively have pairs of earth electrodes 4 formed on the upper surface of the vibration body 1 and the central vibrator 1a has one earth electrode 4 formed thereon. The individual earth electrodes 4 extend to the basal end 1B of the vibration body 1. An intensive pattern 4a is formed on the surface of the vibration body 1 shown in FIG. 1A at the basal end 1B. All the earth electrodes 4 are electrically connected to the intensive pattern 4a. The individual earth electrodes 4 are at a ground potential by unillustrated wiring paths.

The drive voltages are supplied to their corresponding piezoelectric materials serving as driving means through the drive electrodes 2 and the earth electrodes 4.

According to the dielectric polarized structure shown in FIG. 2, the left and right vibrators 1b and 1c are driven by vibration in an X direction in phase, whereas the central vibrator 1a is similarly driven by vibration in the X direction in phase opposite to the left and right vibrators 1b and 1c (with 180° out of phase therewith). Namely, the amplitudes of the left and right vibrators 1b and 1c in the X direction are opposite in direction to the amplitude of the vibrator 1a in the X direction at some point in time.

A pair of detection electrodes 5a and 5b is formed on the upper surface of the central vibrator 1a. In the present embodiment, the detection electrodes 5a and 5b serve as detection output portions provided in pairs. Each of the detection electrodes 5a and 5b extends to a position preceding the basal end 1B at the rear of the vibration body 1. Further, lands 5a1 and 5b1 are formed integrally with the detection electrodes 5a and 5b respectively.

When the vibration body 1 is placed within a rotational system having an angular velocity ω about a z axis in a state in which the vibrators 1a, 1b and 1c are being driven in the X direction, the vibrators 1a, 1b and 1c respectively have vibrational components extending in a Y direction owing to the Coriolis force represented in the equation (1). The amplitude components of the side vibrators 1b, 1c and the central vibrator 1a of the trident tuning fork type vibrator are opposite in direction. Namely, the orientations of the amplitude components of the vibrators 1b and 1c on the Y axis by the Coriolis force are the same at some point in time. The orientation of the amplitude component of the central vibrator 1a on the Y axis is opposite to that of each of the vibrators 1b and 1c.

The detection electrodes 5a and 5b are formed on the same surface (same vibration surface) of the central vibrator 1a. Consequently, the piezoelectric material for the central vibrator 1a functions as Coriolis force detecting means. The dielectric polarization directions of the piezoelectric materials for the portions where the detection electrodes 5a and 5b are formed, are opposite to each other. Thus, the individual vibrators 1a, 1b and 1c are driven by vibration in the X direction by a drive signal supplied from the a.c. drive source 3. Further, when no angular velocity ω is not given, null outputs produced by the vibrations of the central vibrator 1a in the X direction can be obtained in the same phase by an output C detected from the detection electrode 5a and an output D detected from the detection electrode 5b. In addition, Coriolis output components produced by vibrations thereof in the Y direction by the Coriolis force are opposite in phase to each other by the output C detected from the detection electrode 5a and the output D detected from the detection electrode 5b.

Figure 5:
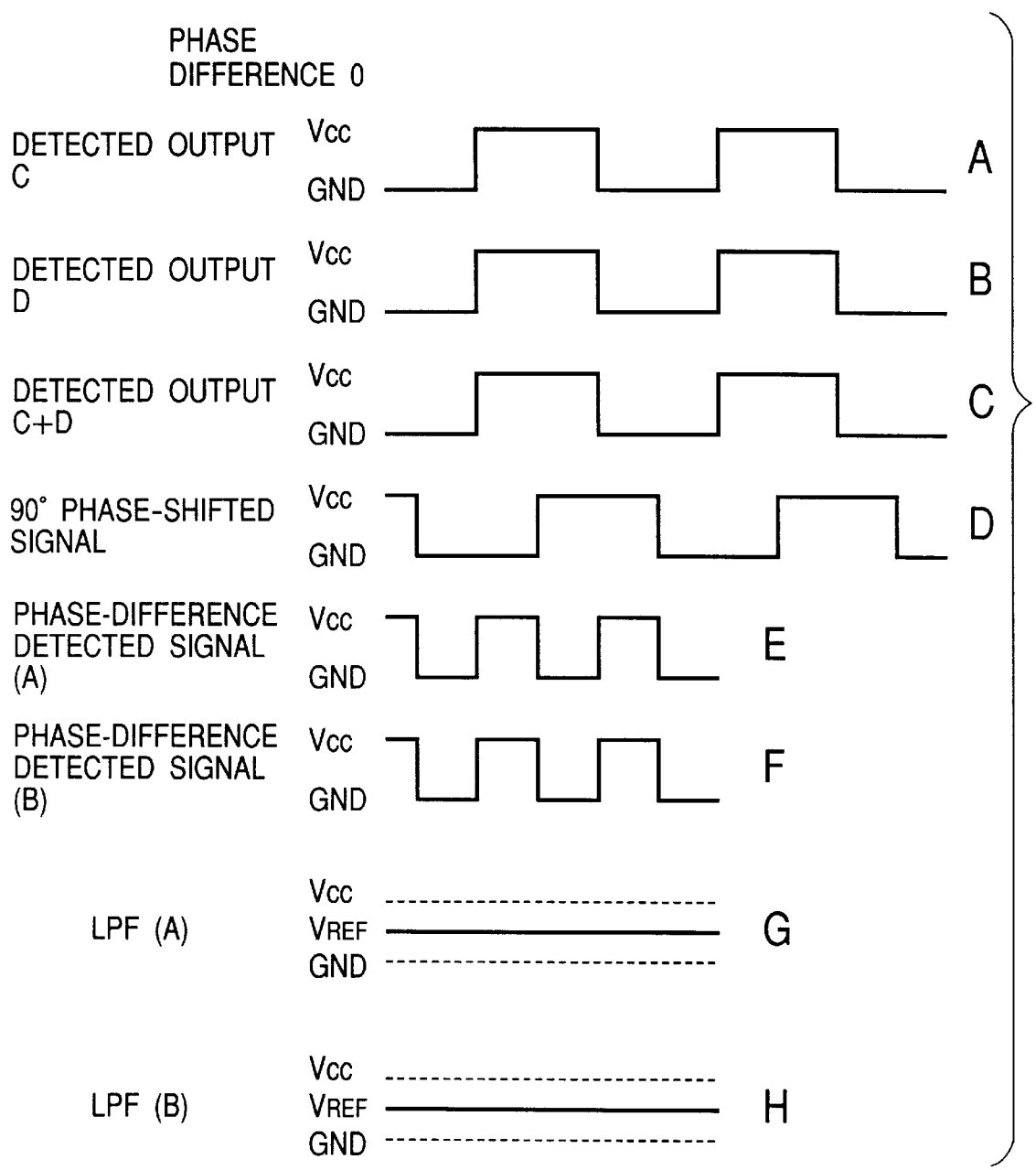
FIG. 5 is a timing chart for describing waveforms of respective components in the detection circuit shown in FIG. 3 at the time that no angular velocity is given.
Figure 6:
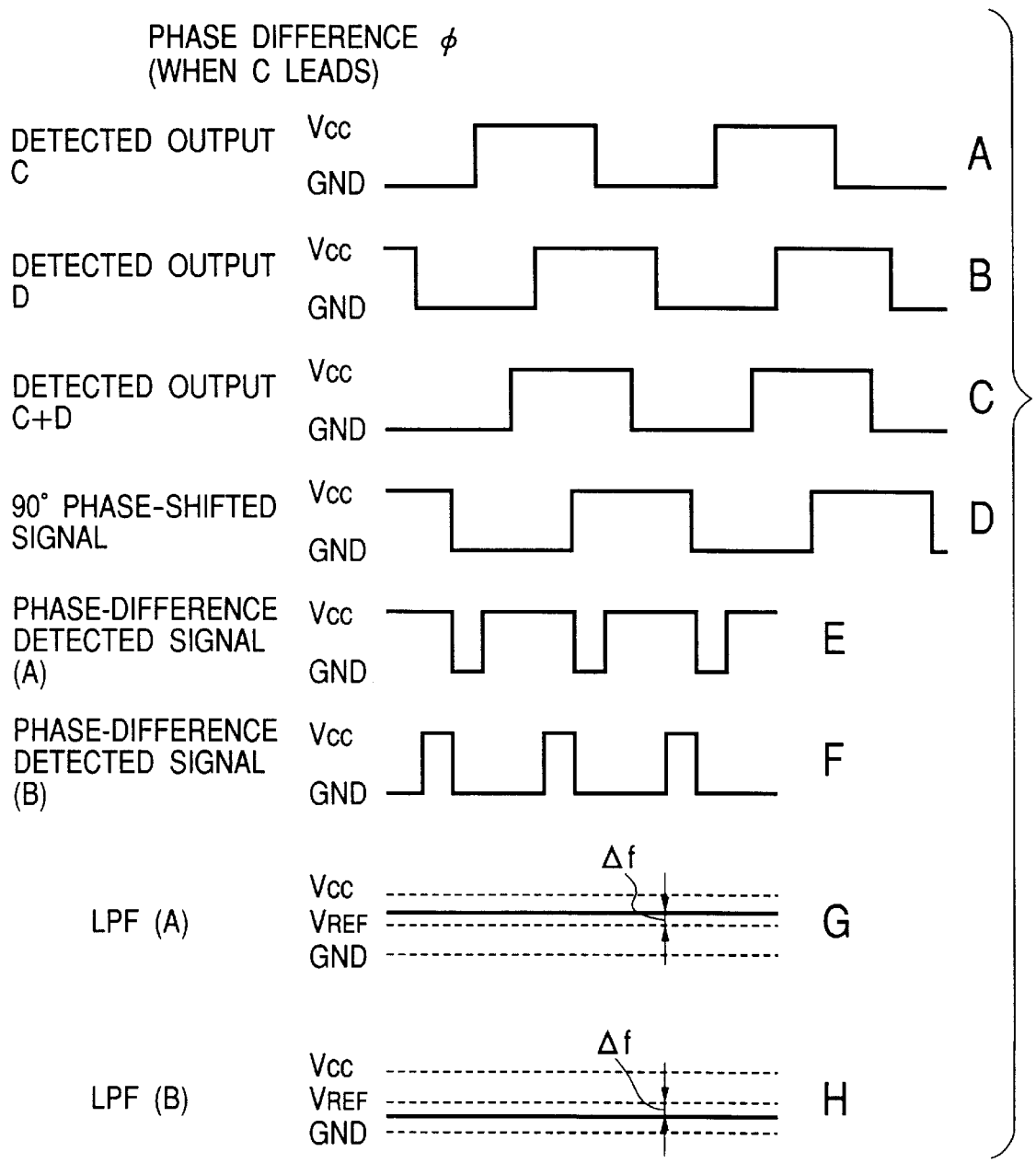
FIG. 6 is a timing chart for describing waveforms of respective components in the detection circuit shown in FIG. 3 at the time that the angular velocity is given.

A detection circuit shown in FIG. 3 will be explained. Signals at respective components of the detection circuit are represented by timing charts illustrated in FIGS. 5 and 6. FIG. 5 shows signals obtained when the respective vibrators 1a, 1b and 1c are driven and no angular velocity ω is given. FIG. 6 illustrates signals obtained when the angular velocity ω is given. In FIGS. 5 and 6, all the signals will be explained as having been waveform-shaped for convenience's sake.

In the detection circuit, the output C detected from the detection electrode 5a and the output D detected from the detection electrode 5b are added together by an adder 11 serving as adding means. A 90° phase-shift circuit 12 produces a 90° phase shift of the added output and a waveform shaping circuit 13 waveform-shapes the signal outputted from the 90° phase-shift circuit 12 to produce a compare signal. FIGS. 5A and 5B and FIGS. 6A and 6B respectively show the detected outputs C and D. FIGS. 5C and 6C respectively illustrate ones obtained by adding the detected outputs C and D. FIGS. 5D and 6D respectively depict 90° phase-shifted compare signals.

Referring to FIG. 3, the detected output C is shaped into a rectangular wave by a waveform shaping circuit 14a. The waveform-shaped signal is supplied to a phase difference detection circuit (A) 15a together with the compare signal sent from the waveform shaping circuit 13. The detected output D is also shaped into a rectangular wave by a waveform shaping circuit 14b. The waveform-shaped signal is supplied to a phase difference detection circuit (B) 15b together with the compare signal. The phase difference detection circuits (A) and (B) shown in FIG. 3 are respectively digital phase comparators comprised of exclusive-OR (EX-OR) gate circuits. FIG. 5E and FIG. 6E respectively show outputs of the phase difference detection circuit (A) 15a. FIG. 5F and FIG. 6F respectively illustrate outputs of the phase difference detection circuit (B) 15b.

The phase-difference detected signal (A) outputted from the phase difference detection circuit (A) 15a is smoothed into a d.c voltage by a low-pass filter (LPF) (A) 16a. The phase-difference detected signal (B) outputted from the phase difference detection circuit (B) 15b is supplied to a low-pass filter (B) 16b where it is smoothed into a d.c. voltage. FIGS. 5G and 5H and FIGS. 6G and 6H respectively show outputs produced from the low-pass filters (A) and (B). Incidentally, each of the low-pass filters (A) 16a and (B) 16b consists of an integrator circuit.

The d.c. voltages smoothed by the low-pass filters (A) 16a and (B) 16b are supplied to a differential amplifier 17. The differential amplifier 17 serves as means for adding the absolute values of a phase difference detected by the phase difference detection circuit (A) 15a and a phase difference detected by the phase difference detection circuit (B) 15b. Since the detected output C and the detected output D are opposite in phase to each other, taking a difference in both outputs enable a phase difference twice as large to be detected.

The output produced from the differential amplifier 17 is amplified by an amplifier 18 and outputted through a low-pass filter 19. The resultant output is equivalent to the difference φ in phase between the detected outputs C and D represented by a vector diagram shown in FIG. 10. This output results from the Coriolis output and the angular velocity ω is determined from the present output.

The phase difference detection circuit (A) 15a detects the difference in phase between each of the waveforms of the detected outputs C shown in FIGS. 5A and 6A and each of the 90° phase-shift signals (compare signals) shown in FIGS. 5D and 6D. Further, the phase difference detection circuit (B) 15b compares the waveforms of the detected outputs D shown in FIGS. 5B and 6B and the 90° phase-shift signals shown in FIGS. 5D and 6D and detects the differences in phase therebetween. These phase difference detection circuits (A) and (B) are EX-OR gates. When signals inputted to the phase difference detection circuits are high and low levels, the outputs produced therefrom are high in level. Except when they are high and low in level, the outputs are low in level.

FIG. 5 shows a state in which the respective vibrators 1b and 1c are vibrated and driven in the X direction in the same phase, the central vibrator 1a is driven by vibration in the X direction in phase opposite to the above phase, and the angular velocity ω about the Z axis is not given.

At this time, both the output C detected from the detection electrode 5a and the output D detected from the detection electrode 5b do not include Coriolis outputs but only detected outputs based on the fact that the vibrator 1a is being by-vibration driven in the X direction, i.e., null output components different in phase from the drive signal by 90°. Thus, the phase difference φ shown in FIG. 10 results in zero and the detected outputs C and D are in phase.

Thus, as shown in FIG. 5E, the duty ratios of the phase-difference detected signal (A) outputted from the phase difference detection circuit (A) 15a and the phase-difference detected signal (B) outputted from the phase difference detection circuit (B) 15b result in 50% respectively. Therefore, the d.c. voltages smoothed by the low-pass filter (A) 16a and the low-pass filter (B) 16b reach VREF identical in level to each other. As a result, the output produced from the differential amplifier 17 results in zero.

FIG. 6 shows a state in which the respective vibrators 1a, 1b and 1c are being driven in the X direction and the angular velocity ω in the Z-axis direction is given.

Figure 10:
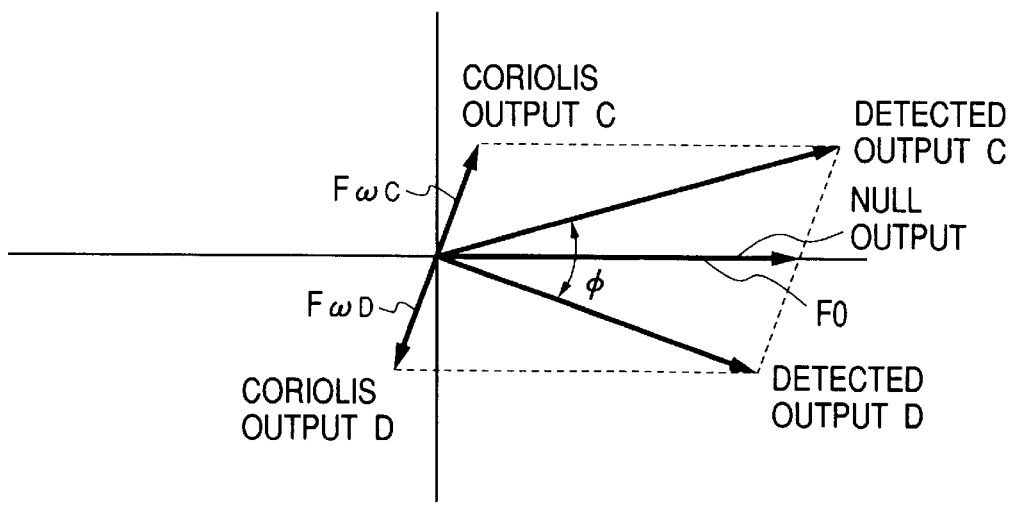
FIG. 10 is a diagram for describing detected outputs in the form of vectors.
Figure 11:
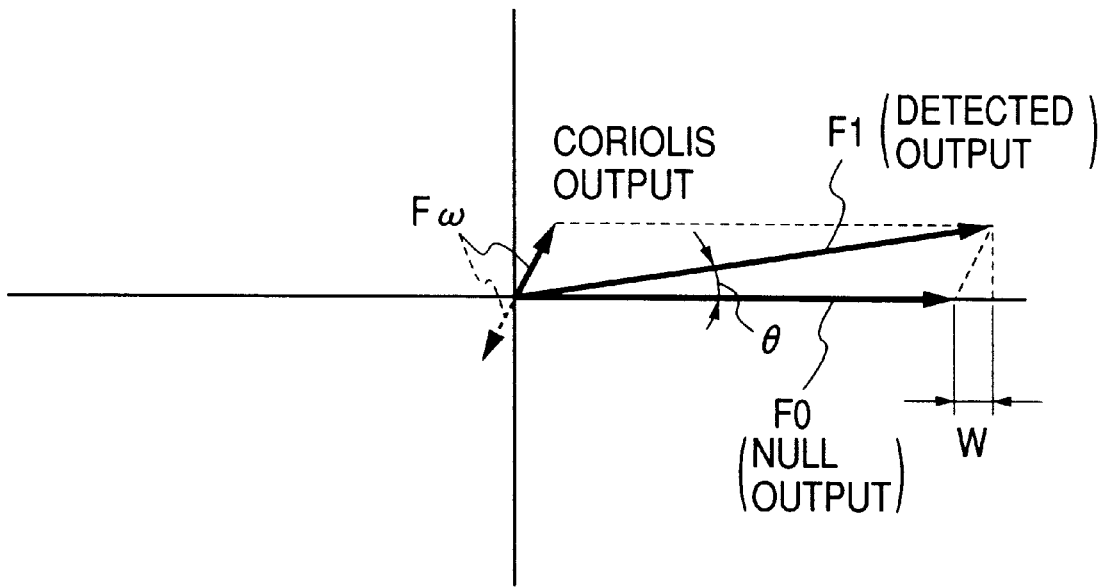
FIG. 11 is a diagram for describing an output detected by a vibratory gyroscope in the form of vectors.
Figure 12A:
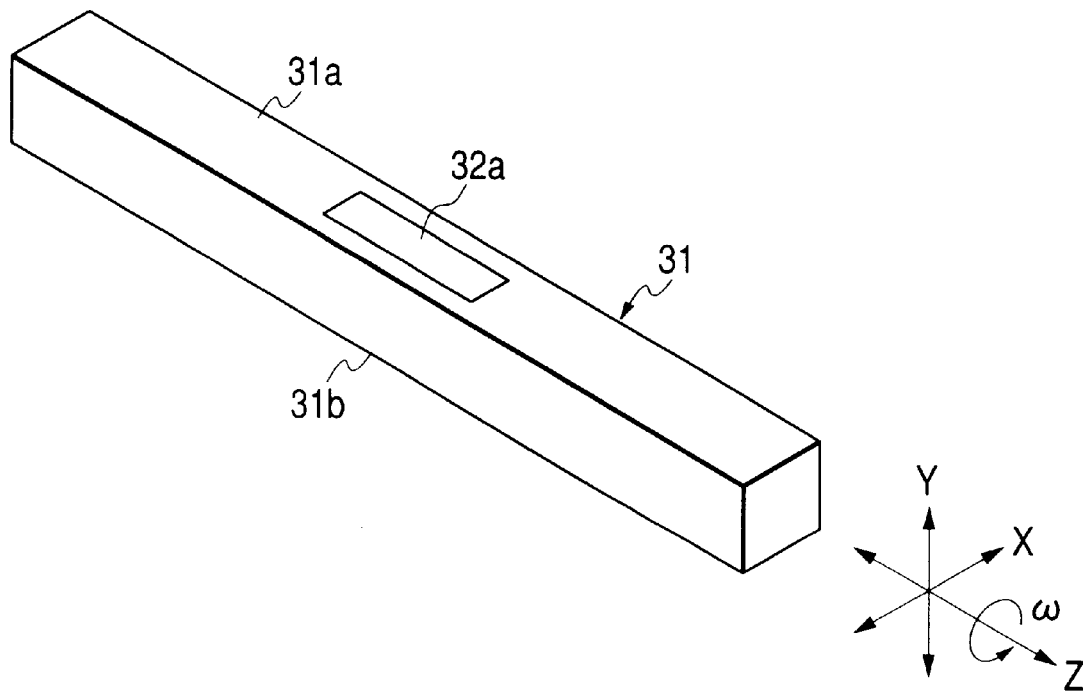
FIG. 12A is a perspective view showing a vibrator of a conventional vibratory gyroscope.
Figure 12B:
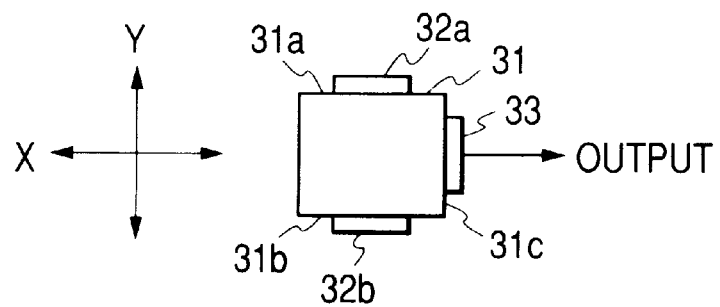
FIG. 12B is a cross-sectional view of the vibrator shown in FIG. 12A.

As described above, in the output C detected from the detection electrode 5a of the central vibrator 1a and the output D detected from the detection electrode 5b, the null outputs are obtained in the same phase and the Coriolis outputs C and D are opposite in phase to each other. In FIG. 10, the null output is represented as F0 and the Coriolis outputs C and D are represented as FωC and FωD. The detected output C corresponds to the sum of vectors F0 and FωC and the detected output D is equivalent to the sum of vectors F0 and FωD.

When the detected output C and the detected output D are added together by the adder 11, the Coriolis outputs C and D having the opposite phases, i.e., FωC and FωD are canceled each other in phase. Thus, a signal being in phase with the null output F0 is produced. FIG. 6C shows a signal of C+D, which does not include the difference in phase between the Coriolis outputs. FIG. 6D shows one obtained by 90° phase-shifting the C+D signal.

The phase difference detection circuit (A) 15a detects the difference in phase between the vector component of the Coriolis output C, e.g., the detected output C whose phase leads and the 90° phase-shifted compare signal (corresponding to the signal shown in FIG. 6D) and thereby obtains a waveform having a duty ratio of 50% or above as shown in FIG. 6E. Similarly, the phase difference detection circuit (B) 15b detects the difference in phase between the detected output D delayed in phase and the 90° phase-shifted compare signal and thereby obtains a waveform having a duty ratio of 50% or less as shown in FIG. 6F. FIGS. 6G and 6H respectively show voltages obtained by respectively smoothing these waveforms by the low-pass filters (A) 16a and (B) 16b.

When the differential amplifier 17 effects subtraction between the voltage (VREF+Δf) smoothed by the low-pass filter (A) 16a and the voltage (VREF−Δf) smoothed by the low-pass filter (B) 16b, the output of the differential amplifier 17 results in Δf+Δf. This is equivalent to one obtained by adding the absolute value of the difference in phase between the detected output C and null output shown in FIG. 10 and the absolute value of the difference in phase between the detected output D and null output shown in FIG. 10. That is, each of Δf and Δf results in a signal equivalent to the phase difference φ. The Coriolis outputs can be detected based on this signal so that the angular velocity ω is determined.

When the angular velocity ω is rotated in reverse, the detected output C lags in phase with respect to the C+D output, whereas the detected output D leads in phase. Thus, the voltage outputted from the differential amplifier 17 results in—(Δf+Δf). Incidentally, the absolute value of (Δf+Δf) is proportional to the absolute value of the angular velocity ω.

A detection circuit shown in FIG. 4 will next be described.

Figure 7:
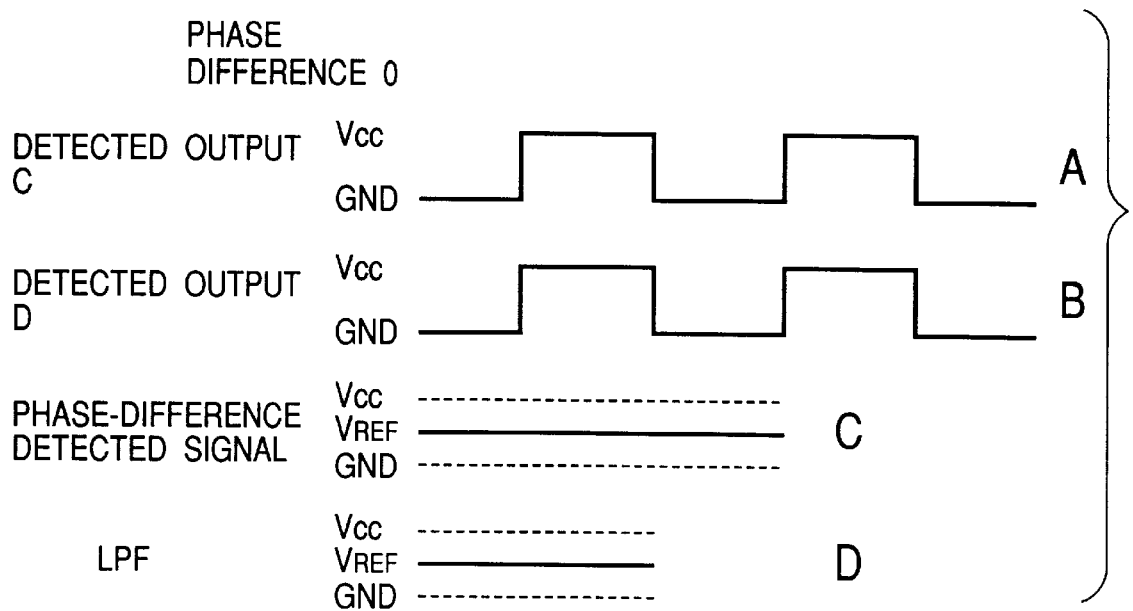
FIG. 7 is a timing chart for describing waveforms of respective components in the detection circuit shown in FIG. 4 at the time that no angular velocity is given.
Figure 8:
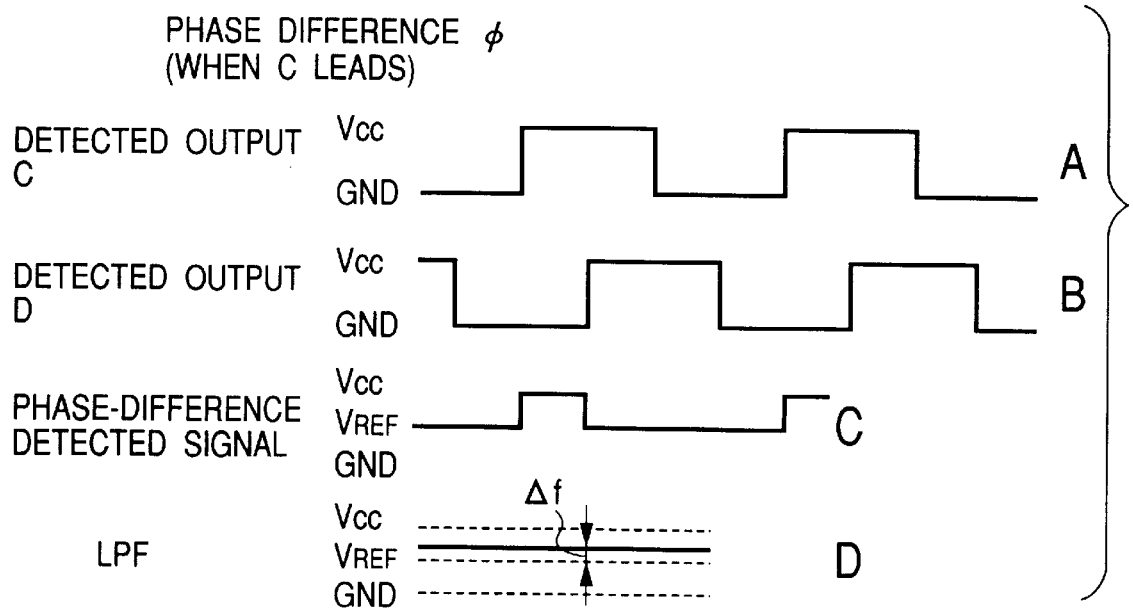
FIG. 8 is a timing chart for describing waveforms of the respective components in the detection circuit shown in FIG. 4 at the time that the angular velocity is given and the phase of a detected output C leads.
Figure 9:
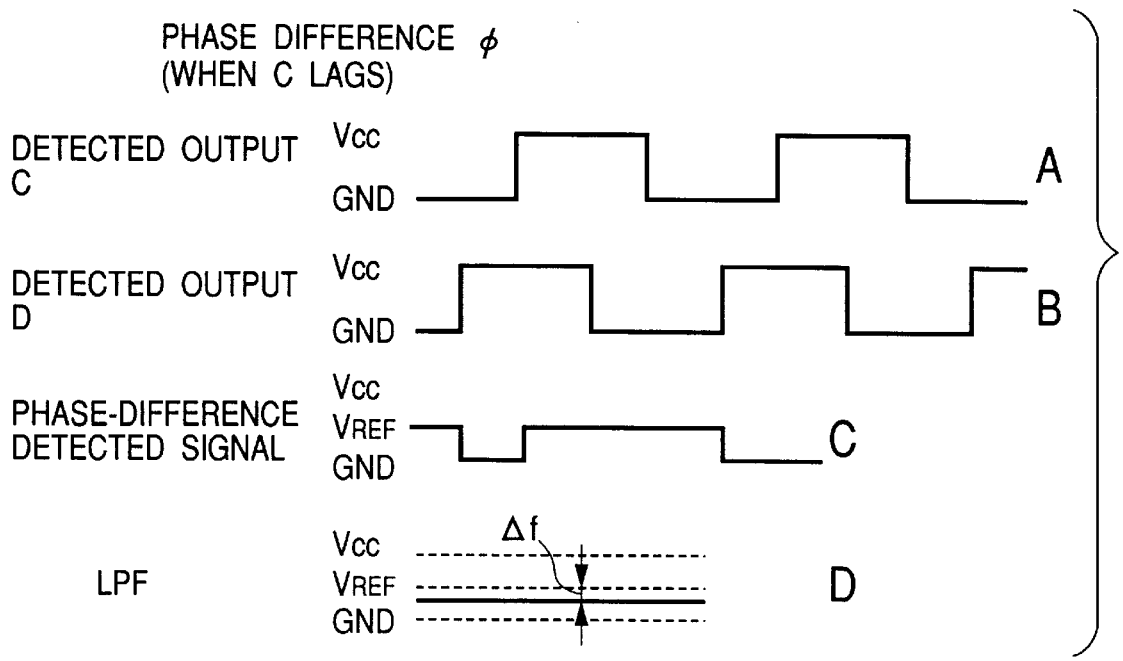
FIG. 9 is a timing chart for describing waveforms of the respective components in the detection circuit shown in FIG. 4 at the time that the angular velocity is given and the phase of the detected output C lags.

In the detection circuit, a waveform shaping circuit (A) 21a waveform-shapes a detected output C produced from a detection electrode 5a and a waveform shaping circuit (B) 21b waveform-shapes a detected output D produced from a detection electrode 5b. FIGS. 7, 8 and 9 show waveforms obtained at respective components in the detection circuit shown in FIG. 4. However, FIGS. 7A, 8A and 9A and FIGS. 7B, 8B and 9B illustrate those obtained by waveform-shaping the detected outputs C and D respectively.

The signals waveform-shaped by the waveform shaping circuit (A) 21a and the waveform shaping circuit (B) 21b are supplied to a phase difference detection circuit 22 from which the difference in phase between the detected outputs C and D is determined. The waveform outputted from the phase difference detection circuit 22 results in a d.c. voltage smoothed by a low-pass filter (LPF) 23 comprised of an integrator circuit. This voltage is amplified by an amplifier 18 so as to be a detected output through a low-pass filter 19. FIGS. 7C, 8C and 9C respectively show waveforms outputted from the phase difference detection circuit 22. FIGS. 7D, 8D and 9D respectively illustrate voltages outputted from the low-pass filter 23.

The phase difference detection circuit 22 shown in FIG. 4 is a phase comparator. When the detected outputs C and D are in phase as shown in FIG. 7, the phase-difference detected signal has a duty ratio of 0% and remains unchanged at VREF. Thus, the output produced from the low-pass filter 23 still remains at VREF as well. FIG. 7 shows a state in which the vibrators 1a, 1b and 1c are driven by vibration in the X-axis direction and no angular velocity ω is given.

When as shown in FIG. 8, the angular velocity ω is given to the vibration body 1 and the Coriolis outputs C and D (FωC and FωD) shown in FIG. 10 are superimposed on one another so that the detected output C leads the null output F0 in phase and the detected output D lags in phase behind the null output F0, the waveform outputted from the phase difference detection circuit 22 results in a rectangular wave that rises with the leading edge of the detected output C as the reference and falls with the leading edge of the detected output D as the reference, as shown in FIG. 8C. Based on the d.c. voltage that has passed through the low-pass filter 23, a voltage increased by ΔF with respect to VREF can be obtained. This ΔF corresponds to the difference φ in phase between the detected output C and detected output D shown in FIG. 10.

A state in which the angular velocity ω rotated in the direction opposite to the above direction is given, is illustrated in FIG. 9. In this case, the detected output C lags in phase behind the null output and the detected output D leads the null output in phase. At this time, the output of the phase difference detection circuit 22 falls with the leading edge of the detected output D as the reference and rises with the leading edge of the detected output C as the reference. Thus, the output produced from the low-pass filter 23 results in VREF−ΔF as shown in FIG. 9D. This ΔF is equivalent to the above-described phase difference φ.

Thus, even in the case of the detection circuit shown in FIG. 4, the Coriolis force can be detected based on the detected voltage ΔF and thereby the angular velocity ω can be determined.

In the present invention, the outputs based on the Coriolis force, which are produced from the pair of detection output portions, are superimposed on one another in phase when no angular velocity is given and in opposite phase when the angular velocity is given. Further, the difference in phase between both detected outputs C and D is detected. Therefore, the phase difference φ to be detected can be made great and the sensitivity to be detected can be made higher than ever.

Even if the intensity (amplitude) of the null output varies due to a temperature drift or the like, no influence is exerted on the accuracy of detection unless the difference in phase between the detected outputs changes.

In the examples illustrated in FIGS. 3 and 4, the difference φ in phase between the detected outputs is electrically processed as a digital signal by the phase difference detection circuit such as the EX-OR gate or the like and the phase difference can be digitally determined. It is therefore possible to reduce the gain of an analog circuit portion and lessen the influence of a circuit drift.

Further, a process for trimming the vibrators 1a, 1b and 1c used for amplitude adjustment as in an amplitude detection system becomes unnecessary.

In the present invention as has been described above, the system for determining the vibrational components based on the Coriolis force from the phase difference makes it possible to detect the phase difference with high sensitivity as compared with conventional devices. It is thus unnecessary to increase the gain of the analog portion in the circuit to achieve these results. Further, the influence of the circuit drift can be prevented.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A vibratory gyroscope comprising:

a vibrator;

driving means for vibrating and driving said vibrator in a predetermined direction;

a detection unit for outputting vibrational components of said vibrator as electric signals by piezoelectric effects;

said detection unit having detection output portions provided in pairs, for obtaining outputs of the same phase when said vibrator is driven by said driving means and an angular velocity is not given to said vibrator and superimposing outputs of vibrational components based on a Coriolis force on one another in phase opposite to each other when the angular velocity is given thereto; and means for detecting a difference in phase between the outputs produced from said detection output portions;

whereby the angular velocity is detected based on the output produced from said phase difference detecting means.

2. A vibratory gyroscope according to claim 1, wherein said detection output portions provided in pairs are electrodes formed on the same surface of said vibrator, and further wherein a piezoelectric material with opposing faces adjacent to the pair of electrodes and having dielectric polarization directions on the opposing faces opposite to each other with respect to a vibrational direction thereof.

3. A vibratory gyroscope according to claim 2, wherein said vibrator is formed of a piezoelectric material over its entirety and said detection output portions are formed by electrodes formed on the surface of the piezoelectric material.

4. A vibratory gyroscope according to claim 1, wherein said vibrator is formed of a piezoelectric material over its entirety and said detection output portions are formed by electrodes formed on the surface of the piezoelectric material.

5. A vibratory gyroscope comprising:

a vibrator;

driving means for vibrating and driving said vibrator in a predetermined direction;

a detection unit for outputting vibrational components of said vibrator as electric signals by piezoelectric effects;

said detection unit having detection output portions provided in pairs, for obtaining outputs of the same phase when said vibrator is driven by said driving means and an angular velocity is not given to said vibrator and superimposing outputs of vibrational components based on a Coriolis force on one another in phase opposite to each other when the angular velocity is given thereto;

adding means for adding outputs produced from said pair of detection output portions to thereby form a compare signal;

first phase difference detecting means for detecting a difference in phase between the output produced from said one detection output portion and the compare signal;

second phase difference detecting means for detecting a difference in phase between the output produced from said other detection output portion and the compare signal; and means for producing the difference between outputs obtained from said first and second phase difference detecting means;

whereby the angular velocity is detected based on the produced differential output.

6. A vibratory gyroscope according to claim 5, wherein said detection output portions provided in pairs are electrodes formed on the same surface of said vibrator, and further wherein a piezoelectric material with opposing faces adjacent to the pair of electrodes and having dielectric polarization directions on the opposing faces opposite to each other with respect to a vibrational direction thereof.

7. A vibratory gyroscope according to claim 6, wherein said vibrator is formed of a piezoelectric material over its entirety and said detection output portions are formed by electrodes formed on the surface of the piezoelectric material.

8. A vibratory gyroscope according to claim 5, wherein said vibrator is formed of a piezoelectric material over its entirety and said detection output portions are formed by electrodes formed on the surface of the piezoelectric material.

* * * * *